(12) United States Patent
Choi et al.

(10) Patent No.: US 9,579,630 B2
(45) Date of Patent: Feb. 28, 2017

(54) BEAD IMMOBILIZED WITH ABSORBENT AND MICROORGANISMS

(71) Applicant: KOREA INSTITUTE OF SCIENCE AND TECHNOLOGY, Seoul (KR)

(72) Inventors: Jae Woo Choi, Seoul (KR); Soonjae Lee, Seoul (KR); Kyung Min Lee, Seoul (KR); Seulki Cho, Seoul (KR); Chang Gu Lee, Seoul (KR); Chanhyuk Park, Seoul (KR); Sanghyup Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/064,939

(22) Filed: Mar. 9, 2016

(65) Prior Publication Data

US 2017/0007984 A1 Jan. 12, 2017

(30) Foreign Application Priority Data

Jul. 7, 2015 (KR) ........................ 10-2015-0096410

(51) Int. Cl.

| B01J 20/32 | (2006.01) |
|---|---|
| B01J 20/34 | (2006.01) |
| B01J 20/20 | (2006.01) |
| B01J 20/24 | (2006.01) |
| B01J 20/30 | (2006.01) |
| B01J 20/28 | (2006.01) |
| C02F 1/28 | (2006.01) |
| C02F 3/34 | (2006.01) |
| C02F 3/00 | (2006.01) |
| C02F 101/32 | (2006.01) |
| C02F 101/34 | (2006.01) |

(52) U.S. Cl.
CPC ........... *B01J 20/3416* (2013.01); *B01J 20/20* (2013.01); *B01J 20/24* (2013.01); *B01J 20/28016* (2013.01); *B01J 20/3085* (2013.01); *C02F 1/283* (2013.01); *C02F 1/286* (2013.01); *C02F 3/348* (2013.01); *C02F 2003/001* (2013.01); *C02F 2003/003* (2013.01); *C02F 2101/322* (2013.01); *C02F 2101/345* (2013.01); *C02F 2303/16* (2013.01)

(58) Field of Classification Search
CPC .................................. B01J 20/32; B01J 20/26
USPC ....................................................... 502/402
See application file for complete search history.

(56) References Cited

U.S. PATENT DOCUMENTS

2004/0072332 A1   4/2004   Suzuki et al.

FOREIGN PATENT DOCUMENTS

| JP | 2005-102669 A | 4/2005 |
| KR | 10-2001-0026952 A | 4/2001 |
| KR | 10-0821780 B1 | 4/2008 |
| KR | 10-1526878 B1 | 6/2015 |

OTHER PUBLICATIONS

Wang, Chuan-Bao, et al. "Synthesizing Nanoscale Iron Particles for Rapid and Complete Dechlorination of TCE and PCBs." Environmental Science & Technology vol. 31, No. 7 (1997): 2154-2156.
Jodra, Y., et al. "Phenol Adsorption in Immobilized Activated Carbon with Alginate Gels." Separation Science and Technology vol. 38, No. 8, (2003): 1851-1867.

*Primary Examiner* — Edward Johnson
(74) *Attorney, Agent, or Firm* — NSIP Law

(57) ABSTRACT

Provided is a bead in which an adsorbent and an organic contaminant-degrading microorganism are supported, wherein an adsorbent for adsorbing organic contaminants is supported on the bead together with an organic contaminant-degrading microorganism for degrading the organic contaminants adsorbed to the adsorbent to allow for the adsorbent to remove organic contaminants in water and to allow for the organic contaminant-degrading microorganism to regenerate the adsorbent.

9 Claims, 4 Drawing Sheets

BEAD IMMOBILIZED WITH ABSORBENT AND MICROORGANISMS

CROSS-REFERENCE TO RELATED APPLICATION

This application claims the priority of Korean Patent Application No. 10-2015-0096410, filed on Jul. 7, 2015, and all the benefits accruing therefrom under 35 U.S.C. §119, the contents of which in its entirety are herein incorporated by reference.

BACKGROUND

1. Field

The present disclosure relates to a bead in which an adsorbent and an organic contaminant-degrading microorganism are supported and a method for preparing the same. More particularly, the present disclosure relates to a bead in which an adsorbent and an organic contaminant-degrading microorganism are supported, wherein an adsorbent for adsorbing organic contaminants is supported on the bead together with an organic contaminant-degrading microorganism for degrading the organic contaminants adsorbed to the adsorbent to allow for the adsorbent to remove organic contaminants in water and to allow for the organic contaminant-degrading microorganism to regenerate the adsorbent. The present disclosure also relates to a method for preparing the bead.

2. Description of the Related Art

Wastewater includes sparingly-degradable organic contaminants, such as chlorophenols. Such sparingly-degradable organic contaminants are not removed by a general biological method for treating wastewater, and thus are removed through an adsorbent.

Such adsorbents for removing sparingly-degradable organic contaminants include use of a nanoscale iron (C. B. Wang, W. X. Zhang, Synthesizing nanoscale iron particles for rapid and complete dechlorination of TCE and PCBs, Environmental Science & Technology, 31 (1997) 2154-2156), use of a composite of calcium alginate with powdered activated carbon (Jorda and Mijangos, Separation Science and Technology, Vol. 38, No. 8, 1851-1867), or the like.

Meanwhile, it is required to regenerate an adsorbent in order to use the adsorbent again after removing organic contaminants in water. According to the related art, adsorbents have been regenerated by applying heat to an adsorbent or treating an adsorbent with a chemical. However, heat application causes a problem of deformation of an adsorbent and chemical treatment causes a chemical to remain in an adsorbent so that it may function as another contamination source.

REFERENCES

Non-Patent Documents

C. B. Wang, W. X. Zhang, Synthesizing nanoscale iron particles for rapid and complete dechlorination of TCE and PCBs, Environmental Science & Technology, 31 (1997) 2154-2156.
Jorda and Mijangos, Separation Science and Technology, Vol. 38, No. 8, 1851-1867.

SUMMARY

To solve the above-mentioned problems, the present disclosure is directed to providing a bead in which an adsorbent and an organic contaminant-degrading microorganism are supported, wherein an adsorbent for adsorbing organic contaminants is supported on the bead together with an organic contaminant-degrading microorganism for degrading the organic contaminants adsorbed to the adsorbent to allow for the adsorbent to remove organic contaminants in water and to allow for the organic contaminant-degrading microorganism to regenerate the adsorbent. The present disclosure is also directed to providing a method for preparing the bead.

In addition, the present disclosure is directed to providing a bead in which an adsorbent and an organic contaminant-degrading microorganism are supported, the bead further including air bubbles supported therein so that the adsorbent and an organic contaminant-degrading microorganism immobilized on the bead surface may be maximized to improve the effect of removing organic contaminants, as well as a method for preparing the same.

In one aspect, there is provided a method for preparing a bead in which an adsorbent and an organic contaminant-degrading microorganism are supported, the method including: providing a bead solution; dispersing an adsorbent and an organic contaminant-degrading microorganism into the bead solution; and irradiating a curing solution with ultrasonic waves, while adding the bead solution containing the adsorbent and organic contaminant-degrading microorganism dispersed therein dropwise to the curing solution, so that each drop of the bead solution may be cured to form a bead, wherein the bead includes bubbles, the adsorbent and organic contaminant-degrading microorganism supported therein, the adsorbent adsorbs organic contaminants in water, and the organic contaminant-degrading microorganism degrades the organic contaminants adsorbed to the adsorbent to regenerate the adsorbent.

According to an embodiment, the organic contaminant-degrading microorganism dispersed in the bead solution may be a microorganism capable of degrading specific organic contaminants. In addition, the adsorbent may be powdered activated carbon.

According to another embodiment, the bead solution may be an alginate solution or chitosan solution, and the curing solution may be an aqueous calcium chloride solution or barium chloride solution.

As the frequency of the ultrasonic waves increases, the size of bubbles supported in the bead increases. In addition, the frequency of the ultrasonic waves may be controlled in a range of 15-90 kHz.

In another aspect, there is provided a bead in which an adsorbent and an organic contaminant-degrading microorganism are supported, the bead including bubbles, an adsorbent for adsorbing organic contaminants in water, and an organic contaminant-degrading microorganism for degrading the organic contaminants adsorbed to the adsorbent to regenerate the adsorbent, wherein the bead is an alginate bead or chitosan bead, and the organic contaminant-degrading microorganism is capable of degrading specific organic contaminants.

According to the bead in which an adsorbent and an organic contaminant-degrading microorganism are supported and method for preparing the same disclosed herein, the following effects are provided.

Since an adsorbent for adsorbing organic contaminants is supported in the bead together with an organic contaminant-degrading microorganism for degrading the organic contaminants adsorbed to the adsorbent to regenerate the adsorbent, any additional process for regenerating the adsorbent is not required and the adsorption efficiency of the adsorbent may be retained at a specific level.

In addition, since an organic contaminant-degrading microorganism is supported selectively depending on the organic contaminant to be treated, it is possible to respond effectively to different types of contaminated water.

DETAILED DESCRIPTION

In one aspect, there is provided a bead in which an adsorbent for adsorbing organic contaminants in water and an organic contaminant-degrading microorganism for degrading the organic contaminants adsorbed to the adsorbent are supported. According to the bead disclosed herein, it is possible for the adsorbent to adsorb and remove organic contaminants and for the organic contaminant-degrading microorganism to regenerate the adsorbent. Since the adsorbent is provided in the bead together with the organic contaminant-degrading microorganism, there is no need for an additional process for regenerating the adsorbent.

Meanwhile, it is required to provide the adsorbent on the bead surface rather than in the inner part of the bead in order to increase the amount of organic contaminants adsorbed to the adsorbent, i.e., in order to increase the efficiency of removing organic contaminants in water through the adsorbent. According to an embodiment, bubbles are used to increase the proportion of the adsorbent immobilized to the bead surface. When bubbles are generated during the preparation of the bead so that they are supported in the bead, the adsorbent is transferred to the bead surface by the surface tension of the bubbles, thereby increasing the amount of the adsorbent immobilized to the bead surface.

Hereinafter, the bead in which an adsorbent and an organic contaminant-degrading microorganism are supported according to an embodiment and the method for preparing the same will be explained in detail with reference to the accompanying drawings.

Figure 1:
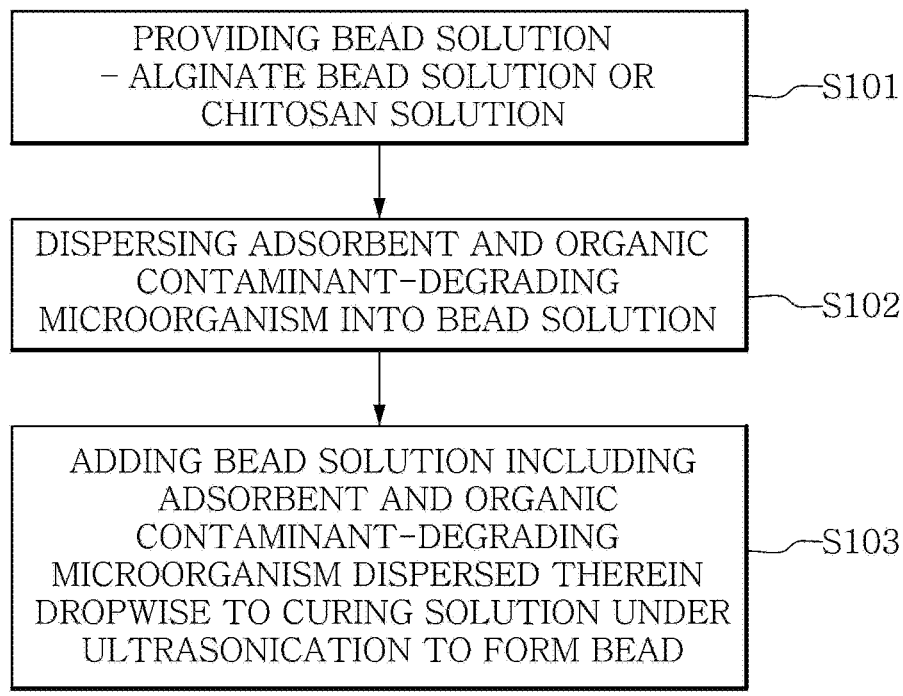
FIG. 1 is a flow chart illustrating the method for preparing a bead in which an adsorbent and an organic contaminant-degrading microorganism are supported according to an embodiment.

Referring to FIG. 1, first, the method for preparing the bead in which an adsorbent and an organic contaminant-degrading microorganism are supported according to an embodiment includes providing a bead solution (S101). The bead solution is converted into beads as a result of the curing as described hereinafter. According to an embodiment, the bead solution may be an alginate solution or chitosan solution. The alginate solution may be obtained by dissolving sodium alginate (Na-alginate) powder or calcium alginate (Ca-alginate) powder into ultrapure water, and the chitosan solution may be obtained by dissolving chitosan powder into ultrapure water. To ensure stable hardness of the beads formed through the curing process as described hereinafter, the bead solution specifically has a concentration of 10-40 w/v %.

After the bead solution is prepared, an adsorbent and an organic contaminant-degrading microorganism are introduced to and dispersed in the bead solution (S102). The organic contaminant-degrading microorganism means one capable of degrading sparingly-degradable organic contaminants, such as toluene, benzene or phenol, and particularly includes any one of microorganism capable of degrading toluene, microorganism capable of degrading benzene and microorganism capable of degrading phenol, or a combination thereof. Further, the microorganism capable of degrading toluene may include *Pseudomonas putida* and the microorganism capable of degrading benzene may include *Pseudomonas aeroginosa*. Depending on the type of organic contaminant to be treated, a microorganism capable of degrading a specific organic contaminant may be incorporated to the bead solution as the organic contaminant-degrading microorganism. The organic contaminant-degrading microorganism is supported in the bead together with the adsorbent through the process described hereinafter, and functions to degrade the organic contaminants in water adsorbed to the adsorbent (e.g. sparingly-degradable organic contaminants, such as toluene, benzene, phenol, or the like), thereby regenerating the adsorbent in the bead. Meanwhile, powdered activated carbon may be used as the adsorbent.

Then, a curing solution is prepared. The curing solution functions to cure the bead solution to which the organic contaminant-degrading microorganism is incorporated to provide beads. As the curing solution, aqueous calcium chloride ($CaCl_2$) solution or barium chloride ($BaCl_2$) solution may be used.

Figure 2:
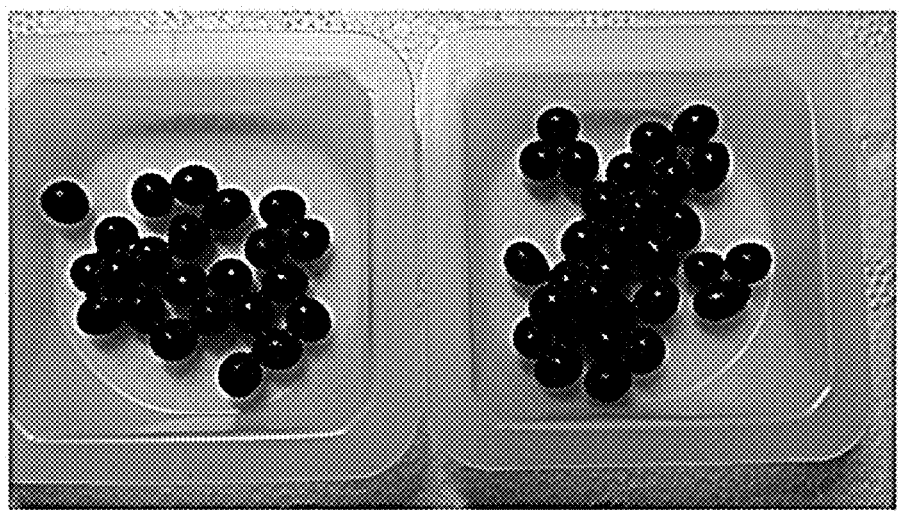
FIG. 2 is a photograph illustrating the bead in which an adsorbent and an organic contaminant-degrading microorganism are supported according to an embodiment.

After the bead solution and the curing solution are prepared, the curing solution is irradiated with ultrasonic waves, while the bead solution to which the adsorbent and organic contaminant-degrading microorganism are incorporated is added dropwise to the curing solution so that the alginate solution may be cured to form beads (S103). The adsorbent and the organic contaminant-degrading microorganism are supported in the cured beads, and the air bubbles generated by the ultrasonication are also supported therein. During the curing of the bead solution, the curing solution is irradiated with ultrasonic waves, and thus the adsorbent and organic contaminant-degrading microorganism are supported in the beads together with the air bubbles. According to an embodiment, the bead solution to which the adsorbent and the organic contaminant-degrading microorganism are incorporated may be subjected to titration, while the ultrasonication bath is filled with the curing solution, thereby providing beads. FIG. 2 is a photograph illustrating the beads in which the organic contaminant-degrading microorganism and air bubbles are supported according to an embodiment.

The intensity of ultrasonication determines whether the air bubbles are supported in the beads or not in addition to the size of air bubbles. When the ultrasonic waves have a frequency of 15 kHz or less, no air bubbles are supported in the beads. When the ultrasonic waves have a frequency of 15 kHz or more, air bubbles are supported in the beads. As the frequency of ultrasonic waves increases from 15 kHz, the size of air bubbles supported in the beads increases gradually. However, when the frequency of ultrasonic waves is larger than 90 kHz, air bubbles are broken and the size of air bubbles decreases again.

When the size of air bubbles increases in proportion to the frequency of ultrasonic waves, the surface tension of air bubbles increases and the air bubbles move toward the bead surface. Herein, the adsorbent and the organic contaminant-degrading microorganism dispersed in the bead solution are combined with the air bubbles and move toward the bead surface. Thus, the adsorbent and the organic contaminant-degrading microorganism are capable of moving toward the bead surface by virtue of the surface tension characteristics of the air bubbles, thereby increasing the adsorption efficiency of organic contaminants to the adsorbent.

Meanwhile, in the above-described embodiment, the adsorbent and the organic contaminant-absorbing microorganism are incorporated together to the bead solution. However, it is possible to incorporate the adsorbent to the bead solution and to incorporate the organic contaminant-degrading microorganism to the curing solution. In this case, the bead solution to which the adsorbent is incorporated may be added dropwise to the curing solution to which the organic contaminant-degrading microorganism is incorporated, thereby forming beads. By using the above method, it is possible to obtain a bead in which an adsorbent, organic contaminant-degrading microorganism and air bubbles are supported. The reason why the adsorbent is incorporated to the bead solution and the organic contaminant-degrading microorganism is incorporated to the curing solution is to enhance the dispersion of the adsorbent and the organic contaminant-degrading microorganism and movement thereof toward the bead surface.

Then, particular examples of the bead in which an adsorbent and organic contaminant-degrading microorganism are supported will be explained.

Test Example 1

Preparation of Control Beads and Inventive Beads

To determine the characteristics of the bead according to an embodiment, the bead in which an adsorbent and an organic contaminant-degrading microorganism are supported as disclosed herein (inventive bead) and the conventional beads (Control 1, Control 2 and Control 3) are prepared. The conventional beads include the following three types of beads: an alginate bead (Control 1), powdered activated carbon-based bead (Control 2) and a bead in which an organic contaminant-degrading microorganism is supported (Control 3).

Control 1 is obtained by the following process.

To 400 mL of distilled water, 16 g of alginate powder is introduced. Next, agitation is carried out for 24 hours to obtain alginate solution. Then, 20 g of calcium chloride ($CaCl_2$) powder is dissolved into 400 mL of distilled water to obtain calcium chloride solution. After that, the alginate solution is added dropwise to the calcium chloride solution from a height of 30 cm to form alginate beads. The calcium chloride solution containing the cured alginate beads is agitated for 4 hours and the alginate beads are recovered.

Control 2 is obtained by the following process.

To 400 mL of the alginate solution of Control 1, 5 g of powdered activated carbon is introduced and agitation is carried out for 10 hours. Next, the alginate solution containing powdered activated carbon dispersed therein is added dropwise to the calcium chloride solution of Control 1 to obtain the beads of Control 2. During the curing, ultrasonication is carried out at 40-50 kHz. The other procedure is the same as the preparation of Control 1.

Control 3 is obtained by the following process.

To 400 mL of the alginate solution of Control 1, 2 g of *Pseudomonas putida* cultured in an LB medium is introduced, followed by agitation. Next, the resultant solution is added dropwise to the calcium chloride solution of Control 1 to obtain the beads of Control 3. During the curing, ultrasonication is carried out at 40-50 kHz. The other procedure is the same as the preparation of Control 1.

The inventive bead is obtained by the following process.

To 400 mL of the alginate solution of Control 1, 5 g of powdered activated carbon and 2 g of *Pseudomonas putida* are introduced together, followed by agitation. Next, the alginate solution to which powdered activated carbon and *Pseudomonas putida* are incorporated is added dropwise to the calcium chloride solution of Control 1, while applying ultrasonic waves at 40-50 kHz, thereby providing the inventive beads. During the curing, ultrasonication is carried out continuously for 30 minutes. In addition, curing is further carried out for 3 hours while interrupting ultrasonication.

Test Example 2

Adsorption and Regeneration Test

Control 1, Control 2, Control 3 and the inventive bead are subjected to an adsorption and regeneration test using toluene.

Each of Control 1, Control 2, Control 3 and the inventive bead is allowed to react with 10-100 mg/L of toluene solution to carry out a toluene adsorption test. Then, the second adsorption test and the third adsorption test are carried out at an interval of 48 hours. The interval of 48 hours between both adsorption tests is for the purpose of regenerating the adsorbent by the organic contaminant-degrading microorganism in the inventive bead.

Figure 3:
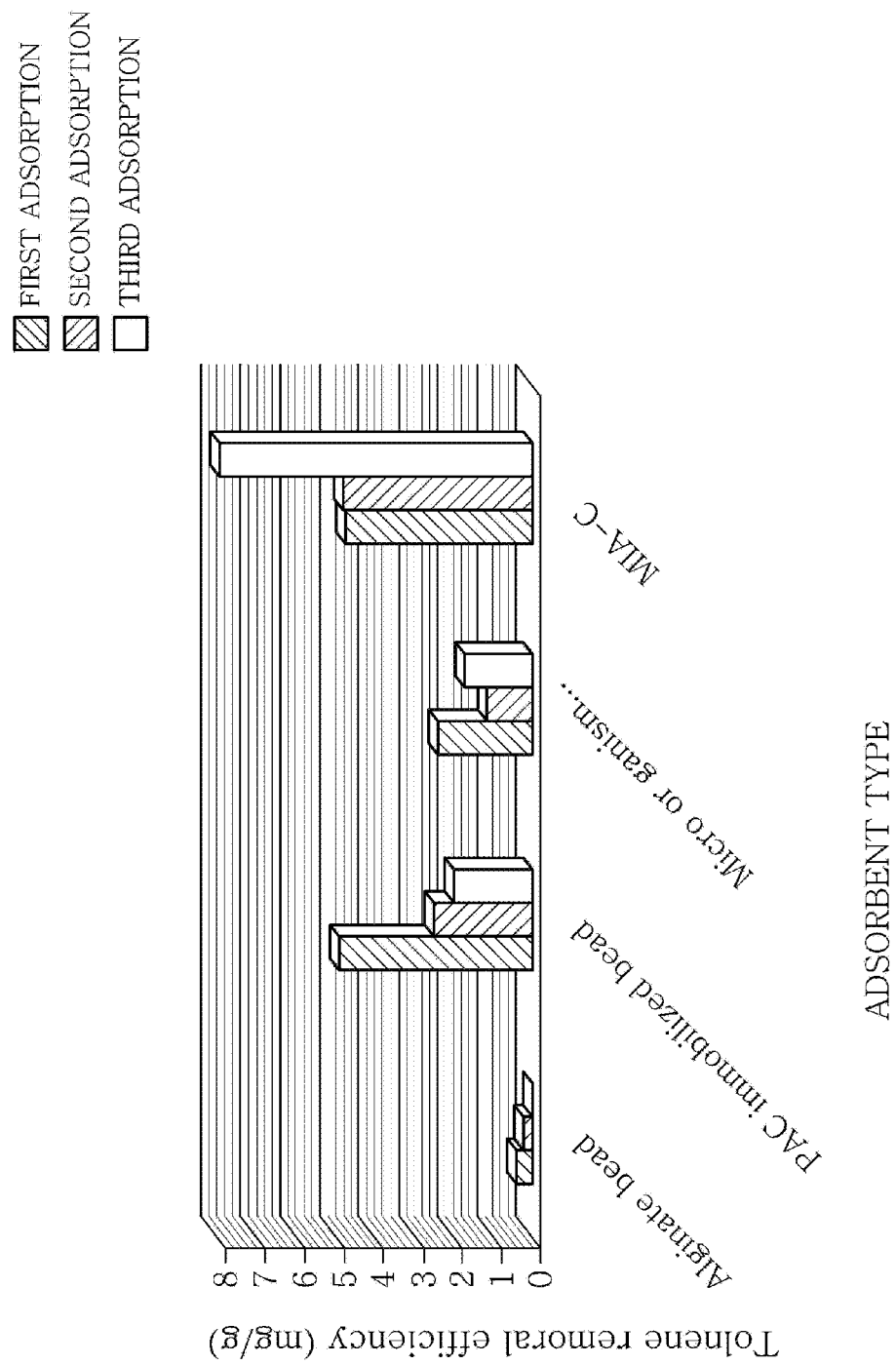
FIG. 3 shows the results of toluene adsorption test for Controls 1-3 and the bead according to an embodiment.

The test results are shown in FIG. 3. Referring to FIG. 3, in the first adsorption test, Control 1 (alginate bead) shows little adsorption ability to toluene, Control 2 (PAC immobilized bead) shows an adsorption ability of 4.93 mg/g, Control 3 (microorganism immobilized bead) shows an adsorption ability of about 2.44 mg/g, while the inventive bead (MIA-C) shows an adsorption ability of about 4.75 mg/g. It is though that the reason why the inventive bead (MIA-C) shows slightly lower adsorption ability as compared to Control 2 (PAC immobilized bead) is that the adsorption sites on the bead surface are occupied by the microorganism.

Meanwhile, as the number of adsorption test increases, Control 1 (alginate bead), Control 2 (PAC immobilized bead) and Control 3 (microorganisms immobilized bead) show a decrease in toluene adsorption ability. On the contrary, in the second adsorption test after the first regeneration, the inventive bead (MIA-C) shows adsorption ability nearly the same as the adsorption ability at the first adsorption test. In the third adsorption test after the second regeneration, the inventive bead shows a toluene adsorption ability improved by 3.13 mg/g as compared to the second adsorption test. This is because the reaction time between the organic contaminant-degrading microorganism and toluene increases in the bead, and thus the organic contaminant-degrading microorganism is activated to increase the degradation rate of organic contaminants.

Test Example 3

Degradation Rate Characteristics of Organic Contaminants

The organic contaminant-degrading microorganism, such as *Pseudomonas putida* or *Pseudomonas aeroginosa*, which degrades sparingly-degradable organic contaminants such as toluene, benzene or phenol, is inhibited in growth when the concentration of organic contaminants in water exceeds a specific level, resulting in a decrease in degradation rate. The point of organic contaminant concentration where the growth is inhibited is referred to as inhibition concentration.

Figure 4:
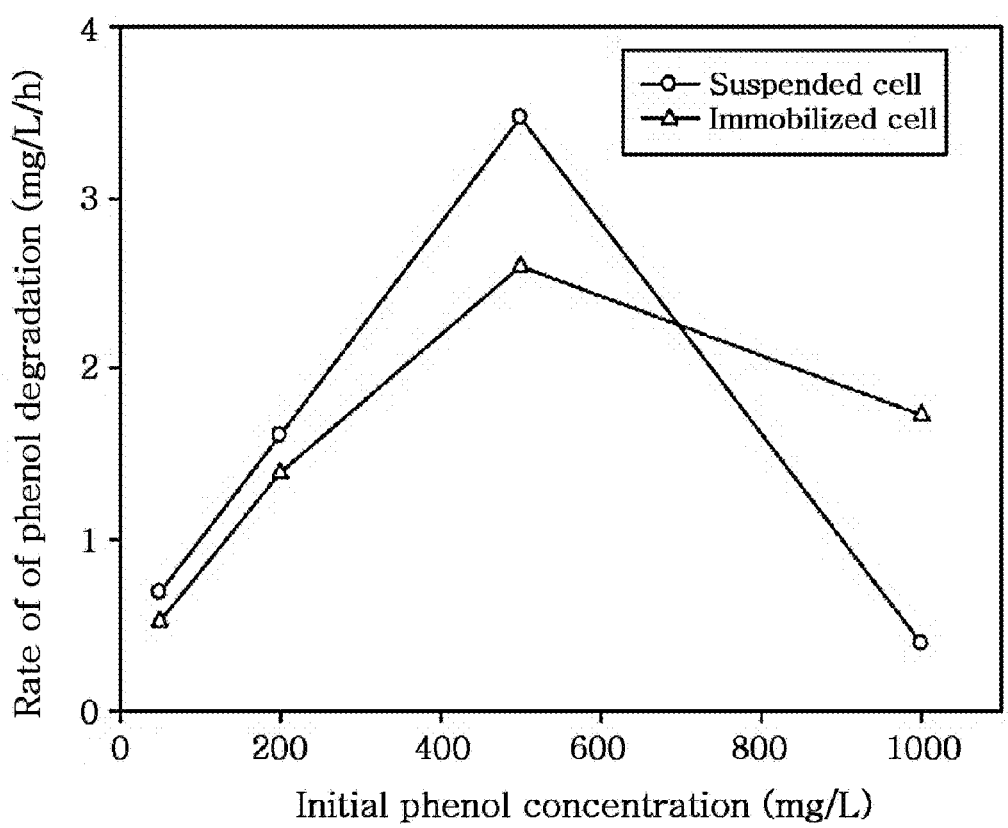
FIG. 4 is a graph illustrating a decrease in decomposition rate for an organic contaminant-degrading microorganism as a function of concentration of organic contaminants.

FIG. 4 shows the characteristics of a decrease in degradation rate for the organic contaminant-degrading microorganism (suspended cell) exposed directly to water and the organic contaminant-degrading microorganism (immobilized cell) supported in the inventive bead. Referring to FIG. 4, both the organic contaminant-degrading microorganism (suspended cell) exposed directly to water and the organic contaminant-degrading microorganism (immobilized cell) supported in the inventive bead cause a decrease in phenol degradation rate, when the phenol concentration exceeds 500 ppm. However, the organic contaminant-degrading microorganism (immobilized cell) supported in the inventive bead shows a smoother decrease in degradation rate as compared to the organic contaminant-degrading microorganism (suspended cell) exposed directly to water. It is thought that this is because the organic contaminant-degrading microorganism is protected by the bead so that it may retain its degradability at a specific level. Therefore, it can be seen that the inventive bead may be applied successfully even to contaminated water containing a high concentration of organic contaminants.

What is claimed is:

1. A bead in which an adsorbent and an organic contaminant-degrading microorganism are supported, wherein air bubbles, an adsorbent for adsorbing organic contaminants in water, and an organic contaminant-degrading microorganism for degrading the organic contaminants adsorbed to the adsorbent to regenerate the adsorbent are supported in the bead.

2. The bead in which an adsorbent and an organic contaminant-degrading microorganism are supported according to claim 1, wherein the adsorbent is powdered activated carbon.

3. The bead in which an adsorbent and an organic contaminant-degrading microorganism are supported according to claim 1, which comprises an adsorbent fixed to the bead surface.

4. The bead in which an adsorbent and an organic contaminant-degrading microorganism are supported according to claim 1, which is an alginate bead or chitosan bead.

5. The bead in which an adsorbent and an organic contaminant-degrading microorganism are supported according to claim 1, wherein the organic contaminant-degrading microorganism is one capable of degrading a specific organic contaminant.

6. The bead in which an adsorbent and an organic contaminant-degrading microorganism are supported according to claim 1, wherein the organic contaminant-degrading microorganism comprises at least one selected from the group consisting of microorganisms capable of degrading toluene, microorganisms capable of degrading benzene and microorganisms capable of degrading phenol.

7. The bead in which an adsorbent and an organic contaminant-degrading microorganism are supported according to claim 1, which is for use in removing organic contaminants in water.

8. The bead in which an adsorbent and an organic contaminant-degrading microorganism are supported according to claim 1, which is obtained by adding a bead solution dropwise to a curing solution to carry out curing of the bead solution, while the curing solution is irradiated with ultrasonic waves, wherein the bead solution comprises an adsorbent and an organic contaminant-degrading microorganism.

9. The bead in which an adsorbent and an organic contaminant-degrading microorganism are supported according to claim 8, wherein the size of the air bubbles supported in the bead increases, as the frequency of the ultrasonic waves increases.

* * * * *